United States Patent [19]

Stephenson et al.

[11] Patent Number: 4,730,313
[45] Date of Patent: Mar. 8, 1988

[54] ACCESS CIRCUIT DIAGNOSTICS FOR INTEGRATED SERVICES DIGITAL NETWORK

[75] Inventors: Jack E. Stephenson, Davie; Jay P. Jayapalan, Hollywood; Ming-Luh Kao, Miami; Charles R. Baugh, Plantation; Jerry A. Miller, Sunrise, all of Fla.

[73] Assignee: Racal Data Communications Inc., Sunrise, Fla.

[21] Appl. No.: 897,556

[22] Filed: Aug. 18, 1986

[51] Int. Cl.⁴ .............................................. G06F 11/20
[52] U.S. Cl. ........................................... 371/5; 371/15
[58] Field of Search ............... 371/5, 22, 32, 11, 31, 371/39; 375/40; 364/200, 900; 455/8, 9

[56] References Cited

U.S. PATENT DOCUMENTS

| | | | |
|---|---|---|---|
| 4,363,123 | 12/1982 | Grover | 371/22 |
| 4,380,067 | 4/1983 | Beardsley | 371/11 |
| 4,390,947 | 6/1983 | DeShon | 364/200 |
| 4,541,091 | 9/1985 | Nishida | 371/5 |
| 4,550,403 | 10/1985 | Beynié | 371/5 |
| 4,616,362 | 10/1986 | Schiff | 371/5 |
| 4,658,399 | 4/1987 | D'Angio | 371/5 |
| 4,675,867 | 6/1987 | Masui | 371/5 |
| 4,677,619 | 6/1987 | Kawai | 371/5 |

OTHER PUBLICATIONS

"Performance Objectives for ISDN's by Sastry.
"Bell Communications Research Technical Advisory No. TA-TSY-000367".
"Bell Communications Research Technical Advisory No. TA-TSY-000194".

Primary Examiner—Michael R. Fleming
Attorney, Agent, or Firm—Jerry A. Miller

[57] ABSTRACT

A method of providing B channel diagnostics to an integrated services digital network (ISDN) comprises the steps of monitoring error performance on the ISDN D channel and comparing the D channel error performance to a predetermined criterion as a measure of the B channel error performance. If the predetermined threshold is exceeded any of a number of possible actions can be taken by a network diagnostics controller including various loopback tests, alerts or network reconfiguration.

23 Claims, 3 Drawing Figures

ACCESS CIRCUIT DIAGNOSTICS FOR INTEGRATED SERVICES DIGITAL NETWORK

BACKGROUND

1. Field of the Invention

This invention relates generally to the field of diagnostic equipment for data communications networks. More particularly, this invention relates to a method and apparatus for performing diagnostics on an access circuit such as a local loop in an Integrated Services Digital Network (ISDN). The method and apparatus provides for an initial determination of B channel error rate without interruptive or disruptive testing. The method and apparatus further provides such initial determination without benefit of knowledge of the protocol of the B channel activity.

2. Background of the Invention

Although the present invention is applicable to diagnostics of ISDN access circuits in general, including those which may include long distance leased lines, it will be described in terms of a simple local loop access circuit for simplicity. Those skilled in the art will recognize that the invention is applicable to primary rate as well as basic rate access to ISDN as well as other rates which may evolve. The present invention is therefore not to be limited to the basic rate example used for illustrative purposes. For purposes of this document, the term "access circuit" is intended to mean the circuit between the user equipment and the ISDN switch.

In basic rate access ISDN, two Bearer channels (B channels) are used to provide 64 KBPS data or voice transmission. According to most standards, this transmission is protocol independent so that it serves to provide a 64 KBPS conduit for user data. In addition to the B channels, a signaling or D channel is provided at 16 KBPS. One of the D channel's primary function is to carry signaling information for the two 64 KBPS B channels. However, due to the bursty nature of the signaling information on the D channel, it is widely anticipated that this channel may also be utilized to carry other types of information when no B channel signaling is in progress. Examples of the types of information anticipated to be carried by the D channel include remote utility meter reading, remote monitoring of alarm systems, and relatively low bit rate terminal data.

A B channel of an ISDN may be either circuit switched or packet switched while the D channel is used to accommodate packet switched data having a packet format very similar to X.25 packets. It is well known that logical channel multiplexing can be accomplished to accommodate many separate logical channels within a single D channel at each node of the network.

Since in most instances it is desirable for user data which is being transmitted over the B channels to remain largely undisturbed so that user data throughput can be maximized, it is desirable to provide a method and apparatus for providing diagnostics functions to the ISDN which minimize interruption or disruption of this user data. The user data which is transmitted over the B channels is generally of unknown protocol as it is usually the function of an ISDN to provide a pipeline for user data without imposing many requirements of the protocol or format for that data. As such, it is generally the case that passive diagnostics which attempt to isolate and correct errors cannot operate in a listen only mode on the B channels since knowledge of the protocol is generally required to accomplish such.

The present invention provides a novel method and apparatus for addressing the needs outlined above by providing a passive diagnostic tool for providing testing of the access circuit of an ISDN.

SUMMARY OF THE INVENTION

Accordingly, it is an object of the present invention to provide a method and apparatus for providing diagnostic services for an ISDN access circuit.

It is another object of the present invention to minimize B channel interruption or disruption in performing such diagnostics.

It is another object of the present invention to provide a diagnostics tool for an ISDN access circuit which performs an equivalent to passive B channel diagnostics without knowledge of the B channel protocol.

It is a further object of the present invention to provide a method and apparatus for making an initial determination regarding line quality without interrupting B channel data.

These and other objects of the invention will become apparent to those skilled in the art upon consideration of the following description of the invention.

In one embodiment of the present invention, a method for providing diagnostics to an ISDN includes the steps of first monitoring error performance of an ISDN D channel and then comparing the D channel error performance with a predetermined error performance criterion as a measure of B channel performance. Preferably, if the error performance of the D channel is poorer than a predetermined threshold (that is for example, the error rate is greater than an allowable threshold), a message is sent to a diagnostics controller which may either begin performing interruptive tests of the B channel, notify the user of a potential problem, and/or reconfigure the network by, for example, taking the access circuit in question out of service.

In another embodiment of the present invention, an apparatus for performing diagnostic operations on an ISDN, includes in combination an interfacing circuit for interfacing to an ISDN access circuit. An error logic circuit monitors error performance of the D channel of said ISDN access circuit. A comparing circuit compares the error performance with a predetermined error criterion and an output circuit produces an output signal in the event the error performance compares unfavorably with the predetermined error criterion.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DESCRIPTION OF THE INVENTION

Figure 1:
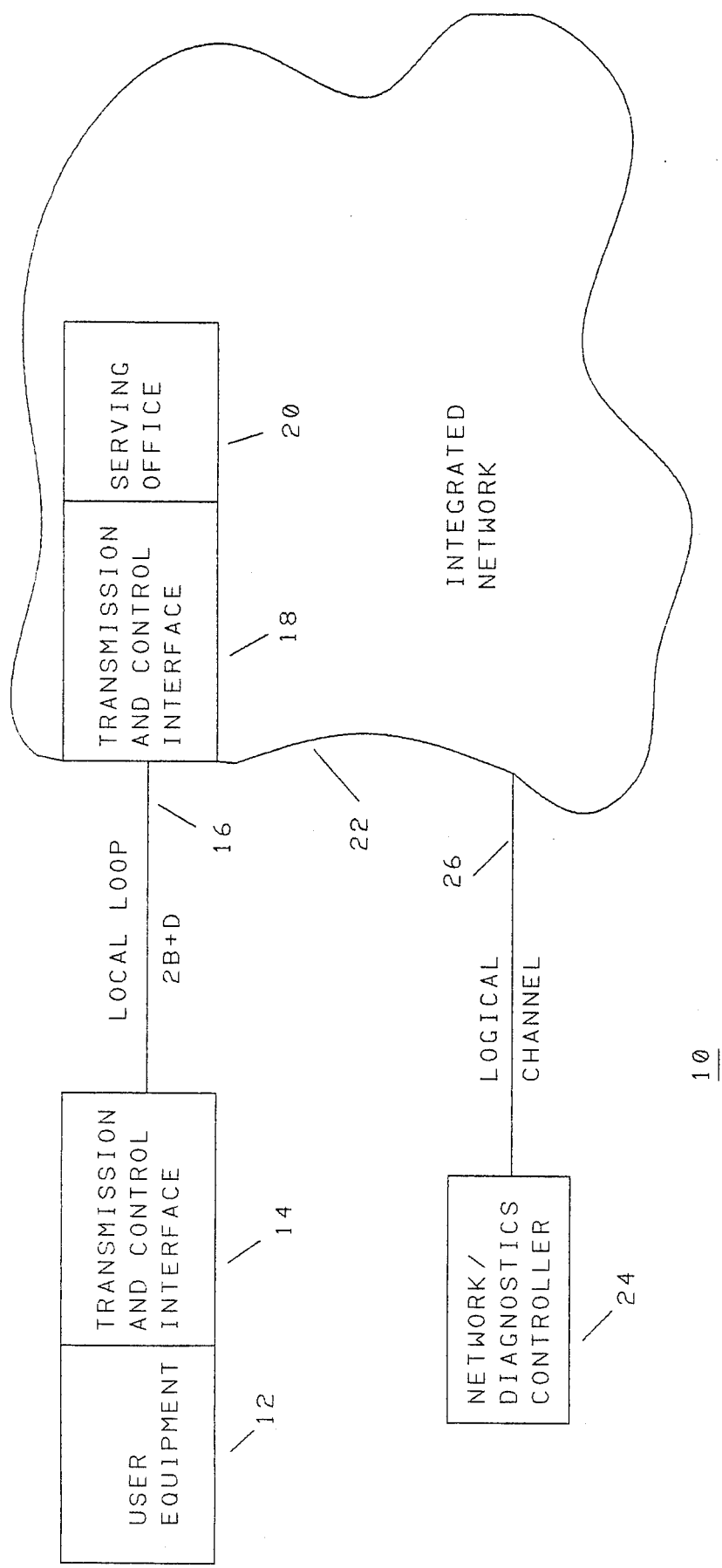
FIG. 1 shows an ISDN according to the present invention including a network/diagnostics controller.

Turning now to FIG. 1, an ISDN includes one embodiment of the present invention is shown and designated generally as 10. It will be understood by those skilled in the art that an ISDN by its very nature is intended to be an extremely versatile communications network which may take on any of numerous configurations. Therefore, the present invention should in no way be limited to the particular network configurations shown and described herein. In the example ISDN 10, user equipment 12 is coupled by transmission and control interface 14 to a local loop ISDN access circuit 16 to a similar transmission and control interface 18 associated with a serving office 20 which includes an ISDN switch. Those skilled in the art will recognize that local loop ISDN access circuit 16 may equivalently be any ISDN access circuit; as such, the terms will be interchanged freely. The transmission and control interface 18 and serving office 20 form part of an integrated network 22 which may be used to provide various known services to both the serving office and the User Equipment. Also forming a portion of the preferred embodiment of the present network is a network/diagnostics controller 24 which is coupled via a packet switched logical channel 26 to the integrated network 22. Since network/diagnostics controller 24 preferably communicates via a packet switched logical channel over the ISDN D channel, its physical location is relatively unimportant. Thus, the network diagnostics controller 24 may be located at the same physical location of the ISDN Switch within the integrated network 22 or on any of the user sites forming a portion of the particular user's network. It will be clear to those skilled in the art that integrated network 22 may include public and private telephone and data networks as well as other suitable networks.

Network/diagnostic controller 24 is preferably similar in design to the diagnostics controller described in U.S. Pat. No. 4,385,384 to Rosbury et al. and assigned to the assignee of the present invention. This patent is hereby incorporated by reference. In the Rosbury patent, the network diagnostics controller is used to perform diagnostics and control tasks similar to those which will be performed by controller 24 except that in the Rosbury et al. patent, the network controller communicates with various diagnostic modems via a low speed FSK secondary channel. In order to be useful in the present environment, the network controller of Rosbury should be suitably modified to accept packetized data communications via the logical packet switched channel rather than communications via low speed FSK secondary channels. Those skilled in the art will readily appreciate that numerous ways to accomplish this are available and are well within the ordinary skill of the art. Such modifications may be made, for example, by substituting circuitry similar or identical to an X.25 pad for the FSK modem of the Rosbury et al. patent. The term "MAYDAY", as used herein to represent a mesage to the diagnostics/network controller, should be interpreted as having analogous meaning to the use of the term in the Rosbury et al patent.

Figure 2:
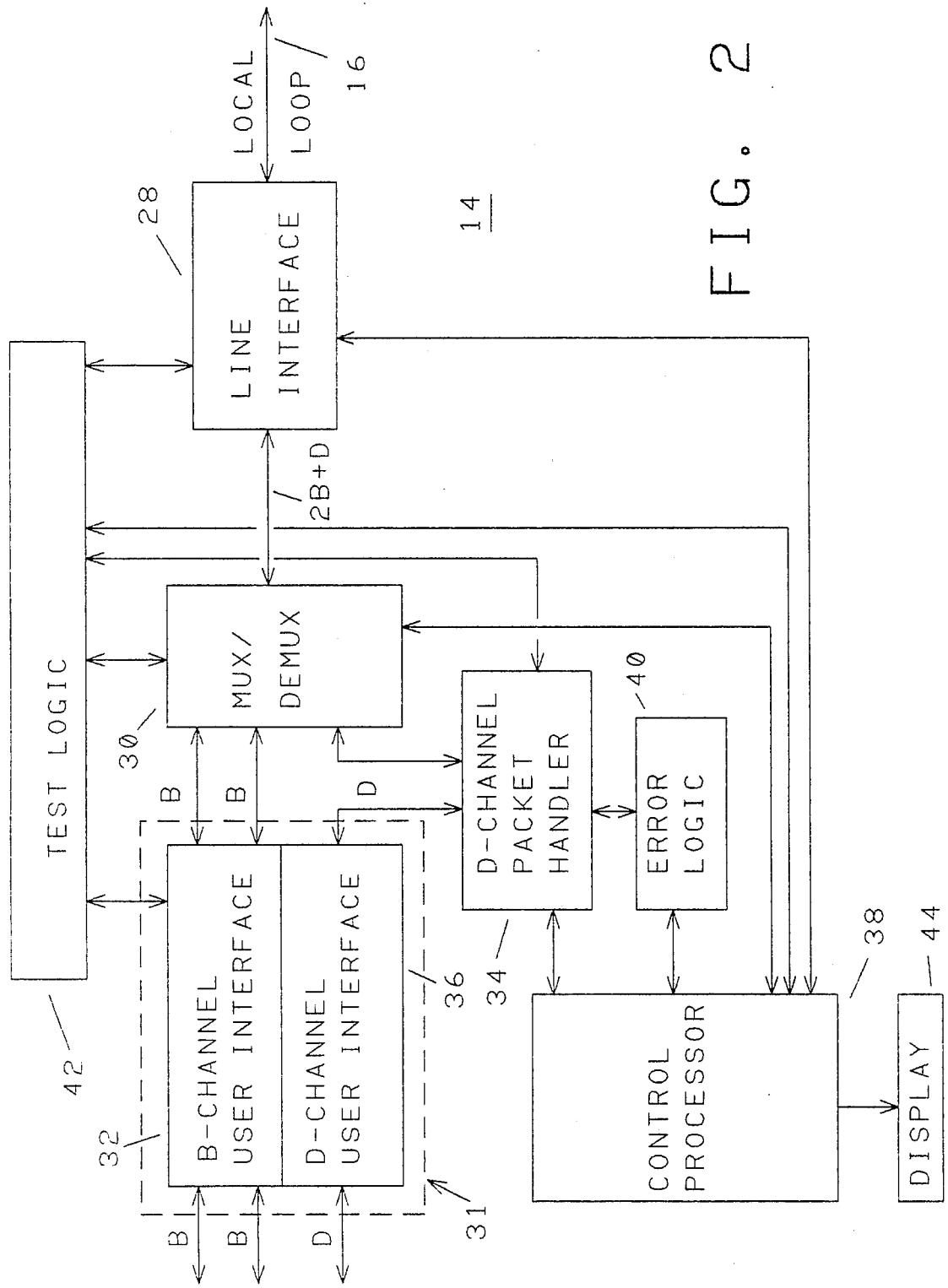
FIG. 2 shows a block diagram of an implementation of the transmission and control portion, ie. that portion which performs the error monitoring and testing functions, of the equipment of FIG. 1.

Turning now to FIG. 2, a more detailed functional block diagram of one embodiment of the transmission and control interface 14 of FIG. 1 is shown. ISDN access circuit 16 is terminated by line interface 28 which may provide line driving and receiving, impedance matching, echo cancellation, loop back switching and other known circuitry used to interface to the physical cable pair. The function of this line interface 28 may correspond to the functions of the "NT1" equipment described in CCITT 1984 recommendations 1.411 and 1.430, but this not to be limiting. From the line interface 28, the digital 2B+D information is provided to a multiplexer/demultiplexer 30 which serves to separate the two B channels and D channel. It also combines outgoing B channel D channel using time multiplexing as is known in the art. The B channel data is routed to user interface 31 and more specifically to a B channel user interface 32, which conditions the B channel information for the user's use at user equipment 12. This user interface 32 may take on many forms according to the nature of the data and the function being accommodated at user equipment 12. For illustrative purposes, B channel user interface 32 is shown to provide two separate B channel paths at the user side of the interface, and D channel user interface 36 is shown to provide a separate D channel. Interfaces 32 and 36 are collectively represented as user interface 31. Those skilled in the art will recognize that this particular configuration should in no way be limiting due to the versatile nature of an ISDN. In fact, the depiction of separate B channels and D channels at the output of 31 should be viewed as conceptual only since it is frequently the case that the B and D channels are still multiplexed together immediately prior to formatting for use by a terminal, telephone, etc.

Packetized D channel data is routed from multiplexer 30 to a D channel packet handler 34 which appropriately routes the D channel packets either to a D channel user interface 36 or to a control processor 38 according to the packet's destination address. The D channel packet handler may include a frame formatter similar to HDLC formatter circuits which are known in the art. On the user side of D channel user interface 36, the output is shown as a single D channel. Once again, it should be understood that since the D channel is packet switched and may include a plurality of logical addresses, this particular configuration is not to be limiting. The D channel interface 36 may include known line driver and receiver circuits as required for appropriate interfacing to the appropriate equipment. The D channel interface 36 may also serve to convert the packetized data to an asynchronous or synchronous data stream and it may perform other known interfacing functions without deviating from the present invention. The D channel user interface 36 together with B channel user interface 32 form the user interface 31. Interface 31 may utilize circuitry similar to that used in a standard CCITT S-interface driver/receiver. The circuitry shown in FIG. 2 may include all CCITT NT1 and NT2 functions plus additional diagnostics and control functions as described herein.

As D channel packets are passed through packet handler 34, the packets are each individually analyzed by error logic 40 which performs error analysis on the packets using known counting and threshold detection circuits. Packets transmitted over the D channel conform to a standard ISDN format which resembles that of X.25 packets and therefore may be readily processed by error logic 40. Error logic 40 performs any of a number of possible error analysis functions on the packets as they pass through the packet handler. In the preferred embodiment, the packet's frame check sequence (FCS) is inspected and compared with a sequence generated by the error logic from the data packets themselves. In this manner part of the function of error logic 40 is that of a comparator. When sequences are compared, any discrepancy indicates that an error has occurred in the data packet. Also according to the preferred embodiment, error logic 40 inspects the packets to see if they contain a retransmit request as retransmit requests are an indication that the similar remote transmit and control interface equipment 18 is having difficulty properly receiving D channel packets transmitted from transmission and control interface 14. Error logic 40 accumulates the number of errors occurring over a predetermined length of time and compares those errors to a threshhold stored internally within a memory portion of error logic 40. If the number of errors exceeds a predetermined threshhold, the error logic 40 sends a message at it's output to control processor 38 that errors have exceeded an allowable threshhold on the D channel. In this manner the error performance of the D channel is measured in the form of an actual error rate and if the error rate exceeds the stored threshold this is indicative that the error performance is poorer than acceptable.

Similarly, error performance may be measured by counting retransmit requests with an excessive number of retransmit requests occurring within a predetermined time period being indicative of unacceptable error performance. Of course, the above techniques for monitoring the error performance is only intended to be illustrative as many other possibilities for monitoring the error performance of the D channel are possible. For example, monitoring the error performance alternately may include but not be limited to the following known error performance evaluation measurements: burst error rate measurement, weighted average error rate measurement, error rate measurement using a sliding time window, counting the number of packets containing errors to determine ratio of bad to total packets and leaky bucket error measurement. Those skilled in the art will recognize other possible error measurement techniques.

It should be noted that the serving office 20 may contain the same or similar circuitry to that shown in FIG. 2. Also, such circuitry may concurrently perform the same or similar functions to that of error logic 40.

It should be noted that in transmission and control interface 18, 2B+D data is time multiplexed over ISDN access circuit 16. Once the 2B+D data reaches the integrated network, the B channels and D channel may utilize different physical wires (or fiber or satellite) connections. Therefore, the B channels and D channel are only assured of using the same media on the ISDN access circuit. Therefore, the present invention is only likely to provide an accurate indication of the error performance of B channels if the errors are occurring somewhere within the access circuit or associated equipment as opposed to those errors occurring in the integrated network. In addition, some indication of the source of D channel errors may be obtained as described below. Since it is well established that most such errors occur somewhere within the access circuits such as local loop networks forming a portion of the customer to network connection, high correlation between D channel error performance and B channel performance is contemplated.

The present invention, therefore, analyzes the error performance of the D channel and recognizes that if D channel errors are occurring, there is a very high probability that B channel errors are also occurring for a particular ISDN access circuit 16. Upon receiving the error message from error logic 40, control processor 38 may take a variety of actions depending upon the exact configuration of the network. In one preferred embodiment, control processor 38 transmits an error MAYDAY to the D channel packet handler to be transmitted via the ISDN access circuit D channel to the network diagnostics controller 24 for the network. This MAYDAY is preferably transmitted in a manner which either requires an acknowledgement or a manner which utilizes a high degree of data redundancy to ensure the integrity of the communication in light of the high error rate apparently occurring on the D channel.

The network diagnostics controller 24, which may be coupled logically to D channel user interface 36 or may be located remotely, may then analyze the nature of the errors occurring on the D channel and take appropriate action and response. In one embodiment, network controller 24 sends a message to control processor 38 via D channel packet ordering control processor 38 to institute various diagnostics tests of the B channel in an interruptive manner. The control processor then implements these tests by invoking test logic 42 which may interface to the B channel user interface 32 via user interface 31, the multiplexer/demultiplexer 30, the line interface 28, and the D channel packet handler 34. Test logic 42 invokes loop back tests at line interface 28, multiplexer/demultiplexer 30 and B-channel interface 32 in an interruptive fashion in an attempt to ascertain the exact location and nature of the problem. Such interruptive loop back tests are well known in the art. Test logic 42 may also perform various noninterruptive tests of the D channel packet handler and other associated circuitry as may be determined appropriate by network diagnostics controller 24. By utilizing the present invention, B channel data is not interrupted unless error measurements of the D channel are indicative that line quality has degraded to a point that user data may be affected. It should be noted that this indication obtained by monitoring D channel data may provide a substantially earlier indication of problems with a particular transmission line than would otherwise be available and, in addition, user data remains uninterrupted until such time as there is an indication that data integrity may be suffering.

Several other embodiments of the present invention are also contemplated. In one such embodiment particularly well suited to a private ISDN, it may be possible to have some knowledge of the protocol of the B channel data. When this is the case, an indication of errors on the D channel may be used to trigger further passive B channel analysis prior to performing any interruptive testing (if necessary). It is also contemplated that poor D channel performance may be used to initiate passive access circuit analysis such as signal to noise ratio measurements, echo performance measurements and the like prior to possible interruptive testing.

In another such embodiment, when the D channel error performance degrades below a predetermined service level, changes in the B channel protocol may be implemented to enhance B channel data integrity. For example, if raw uncoded data is normally transmitted over the B channel, poor error performance can be used to trigger use of a redundant coding scheme such as block coding or forward error correction. If such coding is already in use, a more robust form of coding may be initiated to ensure data integrity.

According to another embodiment of the present invention, a message from error logic 40 indicating high D channel error rates simply causes control processor 38 to provide an indication to the user that there may be a problem. Such embodiments may prove useful to users who do not require the full power available in typical network management and diagnostics systems in exchange for lower cost. Of course, such features are also useful as a part of full featured network control and diagnostic ISDN systems. Control processor 38 may do this by display 44 which may include a simple CRT screen for displaying information by numerical or graphical methods or a simple light panel indicating that an error condition exists. Such displays indicating error performance may be interpreted as either B channel or D channel error performance as desired since either interpretation is accurate assuming the errors are occurring in the ISDN access circuit. Those skilled in the art will also recognize that other forms of alarm may be appropriate, such as an audible alarm indicating that an error count on the channel has exceeded the threshold.

In some circumstances, it may be desirable to immediately and automatically reconfigure the network in the event error logic 40 determines that the D channel error performance is unacceptably poor. In such an instance, control processor 38 may directly institute a teardown of the circuit connection. If possible, the control processor may also reroute B channel data to back-up lines or to other lines carrying lower priority data.

According to another contemplated embodiment, error logic 40 may perform further diagnostic evaluation as follows. Depending upon the exact hardware configuration of the network, further isolation of a source of errors may be possible by further analysis of the D channel packets. For example, separate error rates (or equivalent figures of merit for error performance) may be created for D channel signaling packets and for D channel user data. Errors occurring only in D channel user data and/or other non-signaling D channel packets indicates that the source of the problem is not likely to be a problem with B channel data but is more likely to be associated with the source or destination of the user data or with the intermediate circuitry which does not operate upon signaling packets. This problem may be correctable by reinitiating the D channel logical connection for user data. Conversely, if the error problem appears to only be associated with signaling packets, it can similarly be assumed that B channel data is not suffering. In this case, it is more likely that the equipment associated exclusively with D channel signaling packets is the source of problems. In this case, the control processor may provide an alert signal to the user to indicate that there is a problem or take other appropriate action.

Figure 3:
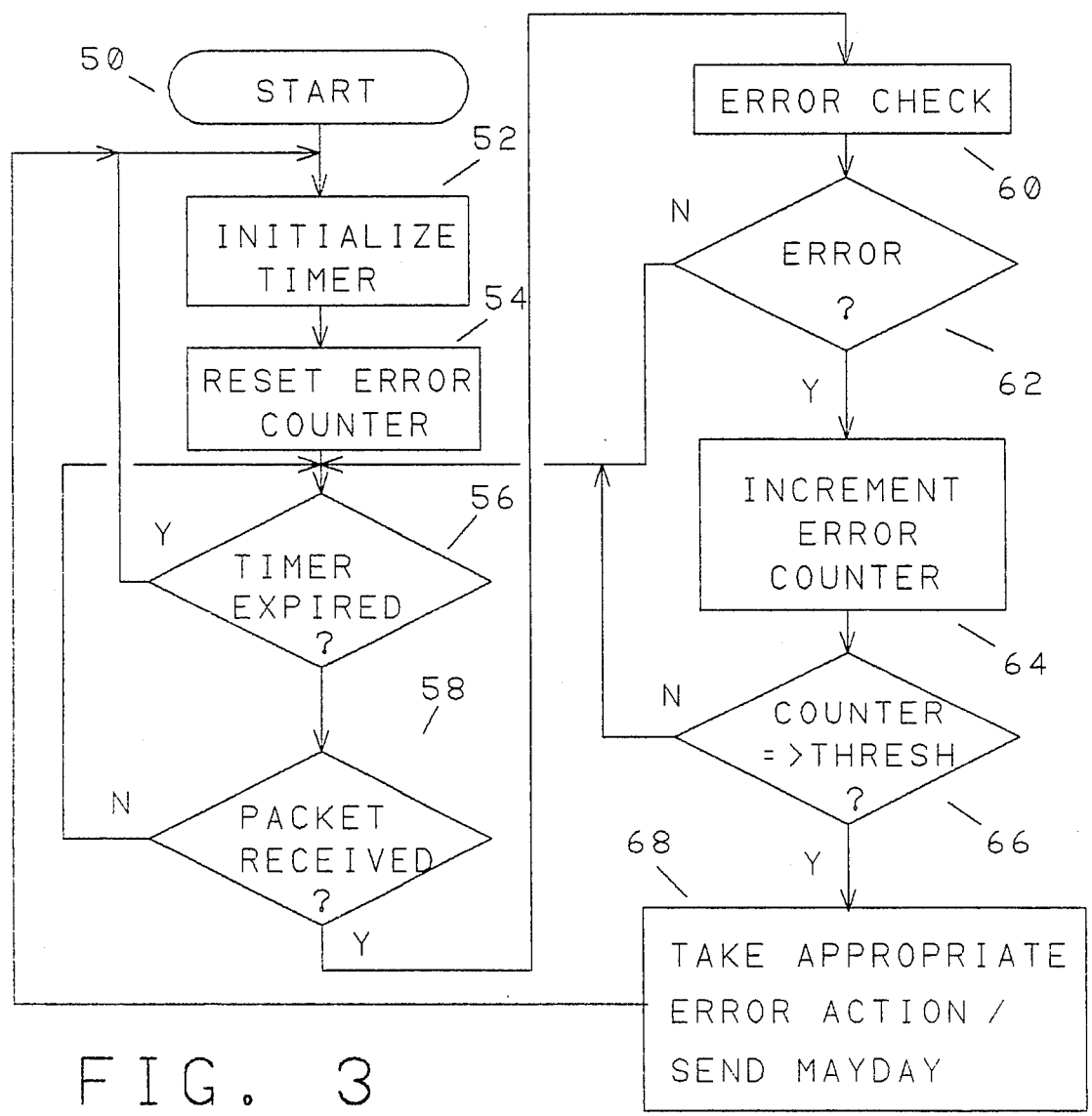
FIG. 3 shows a flow chart of the operation of one embodiment of the present invention.

Operation of the present invention may be further understood by considering FIG. 3 which describes the error processing according to the present invention. It should be noted that this flow chart includes no processes for error recovery, timing recovery, enhancements, etc., so that the invention is not obscured by such details as can be readily added by those skilled in the art. At step 50, the process starts and a timer is initialized at 52. An error counter is initialized at 54 and at 56 the timer is inspected to determine whether or not it has expired. If so, the process returns to step 52 to re-initialize the timer. If the timer has not expired at 56, a D channel packet is received at 58 and error analysis is performed at 60. If a packet is not received at 58, the timer is checked again at 56. If the error analysis shows that no errors have occurred at 62, the process returns to step 56. If, however, an error has occurred at 62, the error counter is incremented at 64. The value of the error counter is then inspected and compared with a predetermined threshhold at 66. This threshold will likely be individually established according to the error requirements of a particular network, that is, some networks will be totally intolerant of any errors while other networks can accept a relatively high error rate and still provide an acceptable level of performance. If the counter has not reached the error threshold at 66, the process returns to step 56. If, however, the threshdhold has been equaled or perhaps exceeded, an error message is transmitted or other appropriate action is taken at step 68 and the process returns to step 52.

It will be understood that the process described by FIG. 3 may be suitably modified according to the sophistication desired or required by the system. For example, step 68, in the preferred embodiment, includes sending a MAYDAY message to a network/diagnostics controller. However, those skilled in the art will recognize that various other actions may be instituted as a result of a positive response in step 66. For example, reconfiguration of the network for direct institution of interruptive tests may be appropriate under some instances.

The present invention recognizes that the bit error rate occurring on a particular D channel should very closely correlate to the bit error rate occurring on the two B channels sharing the same ISDN access circuit if the integrated network is functioning properly. It is this correlation of B channel and D channel error rates which provides the foundation for extrapolating B channel error rates without requiring any knowledge of the protocol in use on the B channels and without the necessity of performing interruptive testing of the B channel. By recognizing this fact as well as the fact that most problems with a data communications network such as that of FIG. 1 are likely to occur in the ISDN access circuits (or the line interface circuits), the present invention is expected to provide a very significant and reliable measure of line quality as measured by the line quality over the weakest link in such a data communications network.

Although the present invention has been described in terms of a local loop ISDN access circuit, those skilled in the art will recognize that the invention is not so limited as it is applicable to virtually any ISDN access circuits. Similarly, the present invention is preferrably implemented largely in software but this is not limiting as hardware equivalents may be used. Also, although the preferred embodiment relates to basic rate 2B+D ISDN access circuits, the present invention may equally well be used in primary rate 23B+D circuits and the like without departing from the present invention.

Thus, it is apparent that in accordance with the present invention, an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit of broad scope of the appended claims.

What is claimed is:

1. A method of providing diagnostic information in an ISDN having a B channel and a D channel, comprising the steps of:
   monitoring error performance of said ISDN D channel;
   establishing a representation of said error performance in a format suitable for comparison with a predetermined error performance criterion; and
   comparing said ISDN D channel error performance with said predetermined error performance criterion as an indication of said ISDN B channel's error performance.

2. The method of claim 1, further comprising the step of initiating a B channel diagnostic process if said D channel error performance is unacceptably poor.

3. The method of claim 2, wherein said diagnostic process includes initiating a loopback test, and wherein said loopback test comprises the steps of:
   routing output signals from a user device connected to said ISDN back to an input of said same user device; and
   evaluating signals received at said user device.

4. The method of claim 2, wherein said B channel diagnostic process includes a passive diagnostic process, said passive diagnostic process comprising the steps of:
   receiving B channel signals from said ISDN:
   measuring predetermined characteristics of said received B channel signals.

5. The method of claim 1, further comprising the step of reconfiguring the network if said D channel error performance is unacceptably poor.

6. The method of claim 1 further comprising the step of displaying a measure of said D channel error performance.

7. The method of claim 1, further comprising the step of displaying a measure of said B channel error performance.

8. The method of claim 1, further comprising the step of transmitting a MAYDAY to a network controller in the event said D channel error performance is unacceptably poor.

9. The method of claim 1, wherein said step of monitoring error performance includes making an error rate measurement of said D channel.

10. The method of claim 1, wherein said step of monitoring error performance includes measuring a rate of retransmission requests.

11. The method of claim 1, further comprising the step of modifying B channel coding to enhance B channel error immunity when said D channel error performance is unacceptably poor.

12. The method of claim 1, wherein said monitoring step includes the steps of:
   monitoring error performance of signaling packets transmitted over said D channel;
   separately monitoring error performance of non-signaling packets transmitted over said D channel; and
   comparing the error performance of said signaling and non-signaling packets to determine if said D channel error performance is and accurate indication of access circuit problems.

13. The method of claim 12, further comprising the step of reinitiating a D channel non-signaling connection if said D channel non-signaling packet error performance is unacceptably poor and said D channel signaling packet error performance is satisfactory.

14. The method of claim 12, further comprising the step of providing an alert signal in the event said D channel signaling packet error performance is unacceptably poor and said D channel non-signaling packet error performance is satisfactory.

15. The method of claim 1, wherein said monitoring step includes the step of checking a Frame Check Sequence (FCS), the checking step comprising the steps of:
   receiving a D channel packet including a received FCS;
   computing FCS for said D channel packet from the contents of said D channel packet; and
   comparing said computed FCS with said received FCS.

16. An apparatus for performing diagnostic operations on an ISDN including a B channel and a D channel, comprising in combination:
   interfacing means for interfacing to an ISDN access circuit;
   error logic means for monitoring error performance of the D channel of said ISDN access circuit;
   means for establishing a representation of said error performance in a format suitable for comparison with a predetermined error performance criterion;
   comparing means for comparing said error performance with said predetermined error criterion; and
   output means for producing an output signal in the event said error performance compares unfavorably with said predetermined error criterion.

17. The apparatus of claim 16, further comprising a diagnostics controller receiving said output signal, for initiating a diagnostic process in response to said output signal.

18. The apparatus of claim 17, wherein said output means includes means for transmitting a MAYDAY signal to said diagnostics controller.

19. The apparatus of claim 17, further comprising loopback means for initiating a loopback test on a user device in response to said diagnostic controller, said loopback test means including:
   test logic means, responsive to said diagnostic controller, for initiating said loopback test wherein signals are routed from an output of said user device to an input of said user device, said test logic means including evaluation means, for measuring predetermined characteristics of signals received at said input of said user device.

20. The apparatus of claim 16, further including display means for displaying a measure of said D channel error performance.

21. The apparatus of claim 16, further including display means for displaying a measure of said B channel error performance.

22. The apparatus of claim 16, further including means for determining if D channel signaling packet errors are occurring at a rate similar to that of D channel non-signaling packets.

23. An apparatus for performing diagnostic operations on an ISDN including a B channel and a D channel, comprising in combination:
   interfacing means for interfacing to an ISDN access circuit;
   error logic means, coupled to said interfacing means, for monitoring an error rate of the D channel of said ISDN access circuit by counting the number of errors occurring over a predetermined period of time;

comparing means, coupled to said error logic means, for comparing said error rate with a predetermined maximum allowable error rate; and output means, responsive to said comparing means, for producing an output signal in the form of a MAYDAY for a network diagnostic controller coupled to said ISDN in the event said error rate exceeds said predetermined maximum allowable error rate.

* * * * *